J. K. SHARPE.
GRAIN SAVING DEVICE FOR THRESHING MACHINES.
APPLICATION FILED NOV. 16, 1914.
1,181,351.
Patented May 2, 1916.
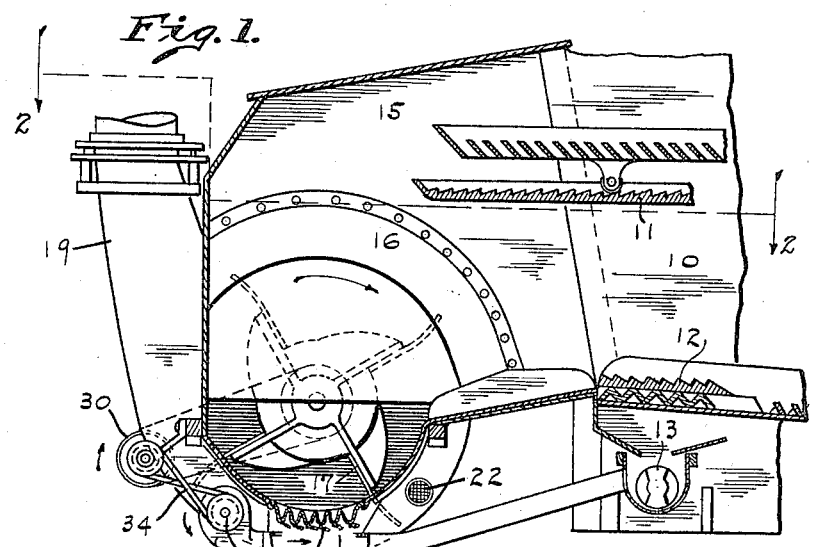
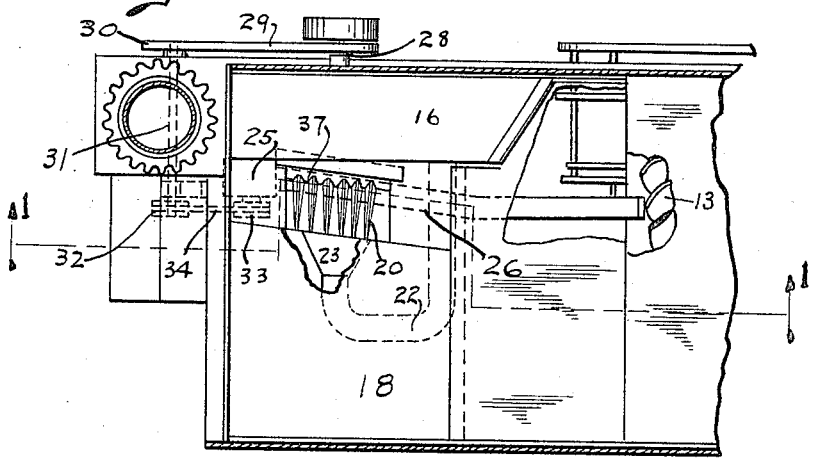

UNITED STATES PATENT OFFICE.

JOSEPH K. SHARPE, OF INDIANAPOLIS, INDIANA.

GRAIN-SAVING DEVICE FOR THRESHING-MACHINES.

1,181,351.  Specification of Letters Patent.  Patented May 2, 1916.

Application filed November 16, 1914. Serial No. 872,325.

*To all whom it may concern:*

Be it known that I, JOSEPH K. SHARPE, a citizen of the United States, residing at Indianapolis, in the county of Marion and State of Indiana, have invented certain new and useful Improvements in Grain-Saving Devices for Threshing-Machines, of which the following is a specification.

My present invention relates to improvements in grain saving devices for threshing machines, and particularly to means for conveying the saved grain from the grain saver to the desired point of delivery, the object being to provide a simple and effective device for the purpose.

In the accompanying drawings, forming a part hereof, Figure 1 is a longitudinal sectional view, taken on the line 1—1 of Fig. 2, showing a portion of a threshing machine with a wind stacker attached thereto, and Fig. 2 is a plan thereof taken on the line 2—2 of Fig. 1.

In said drawings the portions marked 10 indicate a threshing machine including the usual straw carrier, 11, riddle or winnower, 12, and tailings auger, 13. The wind stacker attached to said threshing machine includes the usual straw chamber, 15, fan casing, 16, fan, 17, material-receiving receptacle or hopper, 18, and chute, 19, and associated with said fan housing and hopper is a grain trap, 20, of any well known form, over which straw is conveyed into the stacker fan, and between the guides of which grain is separated and trapped from the straw and discharged beneath to be conveyed as desired, a blast producing device such as a pipe, 22, attached to fan casing 16 and having a distributing nozzle, 23, being utilized for accelerating the movement of the material across and into grain trap 20. Beneath said hopper 18 I arrange a blast fan, 25, and lead therefrom a conduit, 26, to tailings auger 13, or otherwise as desired, said conduit having an opening, 27, for receiving grain and unthreshed heads of grain discharging from said trap. Said fan 25 may be driven from any suitable source, that indicated being from stacker fan shaft, 28, with which a belt, 29, communicates and runs to a pulley, 30, on shaft, 31, a pulley, 32, being at the opposite end of said shaft, with which and pulley, 33, a belt, 34, communicates, and by which mechanism fan 25 is rotated. Upon the under side of grain trap 20 I prefer to provide one or more blast deflectors, as 36, Fig. 1, for deflecting the blast from fan 25 downwardly so that the same will follow the direction of conduit 26.

In operation, as will be readily understood, the straw, chaff, etc., from the threshing machine discharges into hopper 18 and passes over grain trap 20 into fan 17 by which such material is discharged through chute 19 onto the straw stack or elsewhere, and as this material is thus moving along into said fan, loose grain and unthreshed heads conveyed therewith are winnowed therefrom and are caught in said trap and thus prevented from entering said fan, the grain thus saved discharging through opening 37 into conduit 26 where it is caught by the blast from fan 25 and conveyed to tailings auger 13 in the threshing machine to be recleaned, or, as will be readily understood, the point of delivery of said conduit may be directed to any other part of the machine or elsewhere as desired. By this means I provide a simple and effective conveyer for the purpose, which may be conveniently actuated and is positive in its operation.

I claim as my invention:

1. In grain saving devices for threshing machines, the combination of a stacker fan, a receptacle communicating therewith for receiving material and conveying the same toward said fan, a grain trap interposed between said fan and said receptacle for collecting grain separated from such material before it enters said fan, a blast fan adjacent said trap, and a conduit leading from said fan beneath said trap into which said separated grain discharges and through which the same is conveyed by the blast from said fan.

2. The combination, with a stacker fan, a material-receiving hopper, and a grain trap associated with said hopper said trap having an air deflector associated therewith, of a blast fan adjacent said trap including a conduit for conveying material from said trap.

3. In grain saving devices for threshing machines, the combination, with a stacker fan, of a receptacle communicating therewith for receiving material to be conveyed into said fan, a grain trap interposed between said fan and said receptacle for collecting grain separated from such material before it enters said fan, a blast fan adjacent said trap, a conduit leading from said fan and having an opening communicating with said trap into which said separated grain is discharged and through which conduit the same is conveyed by the action of said fan.

In testimony whereof I affix my signature in presence of two witnesses.

JOSEPH K. SHARPE.

Witnesses:
BRUCE NIPPLE,
LEE R. GARBER.

Copies of this patent may be obtained for five cents each, by addressing the "Commissioner of Patents, Washington, D. C."